United States Patent Office 3,210,749
Patented Oct. 5, 1965

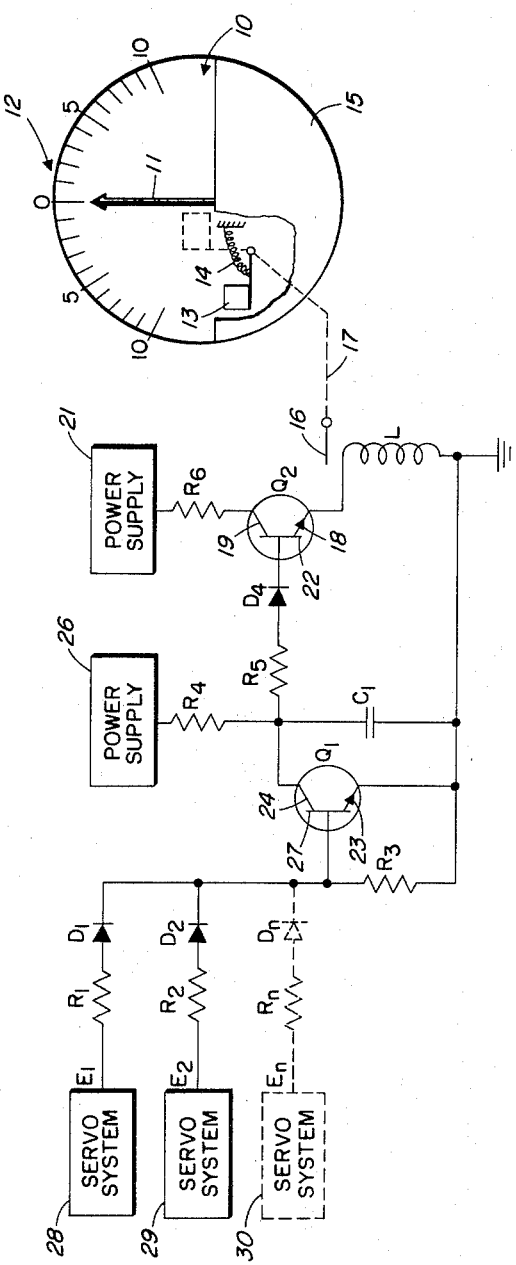

3,210,749
FLAG WARNING CIRCUIT
Leslie A. Magor, Marion, Iowa, assignor to Collins Radio Company, Cedar Rapids, Iowa, a corporation of Iowa
Filed May 31, 1963, Ser. No. 284,514
9 Claims. (Cl. 340—248)

This invention relates in general to error detecting means, and in particular to a circuit capable of giving a warning when error signals in a system exceed a predetermined value or when power fails.

It is oftentimes desirable in systems to know when certain components of a system are not working properly. For example, if an aircraft pilot is flying an airplane in accordance with the indication of a zero-center indicator, a zero-center indication probably means that the aircraft is properly orientated relative to a reference; however, it might mean that some component in the control system has failed so that no signal is applied to the meter. Consequently, under this condition the pilot erroneously believes that he has the aircraft in the proper orientation whereas actually he may be in a dangerous position.

It is an object of the present invention to provide a flag warning system wherein a flag is held out of view when the system is operating properly, but which comes into view when something goes wrong to indicate to the observer that the meter indication is not indicative of the true situation.

Another object of the present invention is to provide a signal monitoring flag warning circuit capable of monitoring a plurality of error signals to cause an indicator to move into view when any one of the error signals exceeds a predetermined value.

Yet another object of the present invention is to provide a flag warning control system capable of monitoring two separate D.C. or A.C. power supplies to cause a warning flag to move onto the face of an instrument upon failure of either or both of the power supplies.

A feature of the invention is found in the provision for a flag warning system comprising a spring biased flag and an inductive circuit for controlling the flag in response to the presense of power supply voltages, or if any one of a plurality of error signals exceeds a predetermined value.

Further features, objects and advantages of this invention will become apparent from the following description and claims when read in view of the drawing which is a partial schematic of the flag warning circuit of this invention.

The figure illustrates an indicating meter 10 which has an indicating needle 11 that may be read against suitable indicia 12.

A warning flag 13 is pivotally supported by the meter case and is biased by spring 14 to move onto the face of the meter so that it is visible. A relay L has its armature 16 coupled by linkage 17 to the flag 13 such that when the armature is energized the flag is moved behind mask 15 and is not visible.

One end of the relay coil L is connected to ground, and the other end is connected to the emitter 18 of a transistor $Q_2$. The collector 19 of transistor $Q_2$ is connected to a first power supply 21 through a resistor $R_6$. Diode $D_4$ is connected to the base 22 of the transistor $Q_2$. A second transistor $Q_1$ has its emitter 23 connected to ground and its collector 24 connected to the junction point between a pair of resistors $R_4$ and $R_5$. The other side of resistor $R_5$ is connected to diode $D_4$, and the other side of resistor $R_4$ is connected to a second power supply 26. Condenser $C_1$ is connected between the emitter and collector of transistor $Q_1$.

A plurality of diode $D_1, D_2 \ldots D_n$ are connected to the base 27 of transistor $Q_1$. A resistor $R_3$ is connected between the base and emitter of transistor $Q_1$.

A plurality of servo systems 28, 29 and 30 receive error input voltages $E_1, E_2 \ldots E_n$ which are supplied respectively to diodes $D_1, D_2 \ldots D_n$ to the base of transistor $Q_1$ through resistor $R_1, R_2 \ldots R_n$.

In operation, the warning flag 13 moves behind the mask 15 when the transistor $Q_2$ is conducting and relay 11 is energized. Relay 11 moves armature 16 down relative to the figure which pulls the flag 13 behind the mask. If the positive voltage from power supply 21 disappears due to a failure of some type, the collector of transistor $Q_2$ will no longer be positive and the transistor of $Q_2$ will cease to conduct. If positive voltage from power supply 26 disappears due to a power failure, the base current to transistor $Q_2$ becomes smaller and transistor $Q_2$ will not conduct.

If any of the error voltages $E_1, E_2 \ldots E_n$ from the servo systems 28, 29 or 30 exceed a predetermined value, transistor $Q_1$ will amplify such voltage which will be filtered by condenser $C_1$ and drive the transistor $Q_2$ to cut off. The values of resistors $R_1, R_2 \ldots R_n$ and diodes $D_1, D_2 \ldots D_3$ determine the predetermined value.

It has been determined experimentally that with two servo systems 28 and 29 connected to the base 27 of transistor $Q_1$ that the transistor $Q_2$ will be cut off and the flag 13 will move into view when the following amplitudes of voltages are reached:

| Error signal: | Magnitude of error to trip flag, volts A.C. |
|---|---|
| $E_1$ only | 1.43 |
| $E_2$ only | 1.43 |
| $E_1$ and $E_2$ equal and in phase | 1.12 |
| $E_1$ and $E_2$ equal and out of phase | 1.36 |

It is seen that this invention provides a flag warning circuit which allows a warning flag to appear on the face of an instrument when either of two power supplies fail or when any one of a number of servo error signals exceed a predetermined value.

Although this invention has been described with respect to a preferred embodiment, it is not to be so limited, as changes and modifications may be made therein which are within the full intended scope of the invention as defined by the appended claims.

I claim:
1. A warning circuit in a system having two separate power supplies comprising a transistor, a warning means connected in the collector-emitter circuit of the transistor, the first power supply connected to the collector-emitter circuit of the transistor, and the second power supply connected to the base of the transistor so that the transistor is driven to cut off when either of the power supplies are removed.

2. A flag warning circuit in a system having two separate power supplies comprising an indicator, a flag pivotally supported by said indicator, a mast behind which said flag may be moved, a relay connected to said flag, a first transistor connected in circuit with said relay to control the position of said flag, the first power supply connected in the collector-emitter circuit of said transistor, the second power supply connected to the base of said transistor, and a source of possible error voltage connected to the base of said transistor.

3. In apparatus according to claim 2 wherein a diode is connected between the second power supply and the base of the transistor.

4. In apparatus according to claim 3 comprising a second transistor with one of its electrodes connected to said diode and the error voltage connected to the base of said second transistor.

5. In apparatus according to claim 4 where a plurality of error producing circuits are connected to the base of the second transistor.

6. A flag warning circuit in a system having two separate power supplies comprising a flag pivotally supported on a meter, a spring biasing said flag in a first direction, a relay connected to said flag and when energized to move it against said spring, a first transistor connected in circuit with the relay, the first power supply connected in the collector-emitter circuit of the first transistor, the second power supply connected to the base of the first transistor, a second transistor with an output electrode connected to the base of the first transistor, and an error voltage source connected to the base of the second transistor.

7. In apparatus according to claim 6 wherein a capacitor is connected between the collector and emitter of the second transistor.

8. In apparatus according to claim 6 wherein a diode is connected between the second transistor and the base of the first transistor.

9. In apparatus according to claim 8, a plurality of error producing circuits connected to the base of the second transistor.

References Cited by the Examiner

UNITED STATES PATENTS

| | | |
|---|---|---|
| 2,905,678 | 9/59 | Malchow. |
| 3,038,106 | 6/62 | Cutsogeorge et al. ____ 340—233 X |
| 3,084,338 | 4/63 | Mauer et al. |
| 3,094,691 | 6/63 | Treffeisen. |

NEIL C. READ, *Primary Examiner.*